United States Patent [19]

Muszynski

[11] Patent Number: 5,722,074
[45] Date of Patent: Feb. 24, 1998

[54] SOFT HANDOFF IN A CELLULAR TELECOMMUNICATIONS SYSTEM

[75] Inventor: Peter Muszynski, Espoo, Finland

[73] Assignee: Nokia Telecommunications Oy

[21] Appl. No.: 619,701

[22] PCT Filed: Sep. 24, 1993

[86] PCT No.: PCT/FI93/00385

§ 371 Date: Jun. 14, 1996

§ 102(e) Date: Jun. 14, 1996

[87] PCT Pub. No.: WO95/08899

PCT Pub. Date: Mar. 30, 1995

[51] Int. Cl.[6] ............................................. H04Q 7/00
[52] U.S. Cl. ..................... 455/442; 455/422; 455/436; 455/502; 375/206; 370/331; 370/335; 370/337
[58] Field of Search ............................ 455/422, 432, 455/436, 437, 438, 439, 442, 443, 444, 450, 455, 500, 502, 507, 517; 375/200, 206; 370/331, 335, 332, 320, 321, 337

[56] References Cited

U.S. PATENT DOCUMENTS

| | | |
|---|---|---|
| 4,696,052 | 9/1987 | Breeden . |
| 5,267,261 | 11/1993 | Blakeney, II et al. .......... 455/442 |
| 5,345,448 | 9/1994 | Keskitalo ...................... 455/439 |
| 5,408,517 | 4/1995 | Nyhart et al. .................. 455/442 |

FOREIGN PATENT DOCUMENTS

| | | |
|---|---|---|
| 92/22966 | 12/1992 | WIPO . |
| 93/06663 | 4/1993 | WIPO . |

OTHER PUBLICATIONS

"An Overview of the Application of Code Division Multiple Access (CDMA) to Digital Cellular Systems and Personal Cellular Networks", May 21, 1992, pp. 1–58.

Primary Examiner—Edward F. Urban
Assistant Examiner—Doris To
Attorney, Agent, or Firm—Cushman Darby & Cushman IP Group of Pillsbury Madison & Sutro LLP

[57] ABSTRACT

A soft handoff in a cellular telecommunications system in which a user mobile station relays user communication radio signals via at least two base stations to and from a controlling mobile exchange connected to another system user. The relay of user information signals is performed by using digital frames carried on digital transmission connections in the uplink and downlink directions. The differential delay of the two or more terrestial routes between the base stations and the exchange is compensated by a novel time alignment procedure. Each of the base stations sends time alignment request to the mobile exchange which performs the frame time alignment of the downlink transmissions by taking into account TA requests from all base stations.

16 Claims, 3 Drawing Sheets

SOFT HANDOFF IN A CELLULAR TELECOMMUNICATIONS SYSTEM

This application claims benefit of international application PCT/FI93/00385, filed Sep. 24, 1993.

FIELD OF THE INVENTION

The present invention relates to cellular telecommunications systems. More specifically, the present invention relates to a novel and improved handoff between a mobile station and base stations within a cellular telecommunications system.

BACKGROUND OF THE INVENTION

The use of code division multiple access (CDMA) modulation is but one of several techniques enabling digital communications among a number of mobile users utilizing a common part of the radio spectrum, as is the case for cellular telecommunications systems.

Other well-known radio access techniques are time division multiple access (TDMA) and frequency division access (FDMA). The concept of soft handoff to which the present invention is closely related, is indeed applicable to all three of the mentioned multiple access techniques and will result, if applied instead of the conventional hard handoff schemes, in increased system capacity and fewer dropped calls. However, soft handoff is mandatory for CDMA, as the use of conventional hard handoff would result in a very poor system performance. For these reasons, the embodiment of the present invention is presented for a CDMA cellular telecommunications system, however, it should be understood that the present invention is not limited to CDMA.

An exemplary application of CDMA to cellular telecommunications systems has been substantially described in "On the System Design Aspects of Code Division Multiple Access (CDMA) Applied to Digital Cellular and Personal Communications Networks", Allen Salmasi and Klein S. Gilhousen, presented at the 41st IEEE *Vehicular Technology Conference* on May 19–22, 1991 in St. Louis, Mo.

In the just mentioned publication a direct-sequence CDMA (DS-CDMA, or shortly, CDMA in the following) technique is described in which a number of user mobile stations (MSs) communicate via CDMA radio spread spectrum signals with base stations (BSs, also referred to as cell sites) in the uplink (mobile station to base station) and downlink (base station to mobile station) directions. The base stations convert these CDMA radio signals originating from, respectively terminating at, the user's MS into a form appropriate for the use in conjunction with terrestrial telecommunications transmission equipment such as the commonly deployed Pulse Code Modulation (PCM) circuit facilities. The base stations further relay these user signals in the uplink and downlink directions to the mobile switching center (MSC, also referred to as mobile exchanges or mobile telephone switching office (MTSO)) for further processing. Usually the user information signals are transferred on these terrestrial links in a digital, framed format. This frame structure may be derived and adapted from the frame structure used for the radio signals which is typically defined by the voice coding process.

The just mentioned framed user communication signals comprise digitized voice signals and control information (also referred to as signaling). The MSC performs multiplexing and conversion operations on the just mentioned tributaries and relays the voice signal to the other communication user within the Public Switched Telephone Network (PSTN). The MSC also interprets, reacts upon, and generates signaling information, thus controlling the overall communication link between the system users. These communications link control functions comprise the management of general call related events such as call setup or tear down as well as CDMA radio link related events such as the deterioration of the CDMA radio link quality and subsequent handoff initiation.

If CDMA is deployed within the typical medium to large sized cells of land mobile telecommunications systems then the average time delay spread of the multipath radio propagation environment is usually larger than the chip duration of the DS-CDMA signal. This forces CDMA to operate in an asynchronous mode with the consequence that the orthogonality of the spread spectrum multiple access user signals cannot be achieved by means of orthogonal spreading codes alone. Therefore, the communications suffer from system self-induced interference not only among signals originating from different cells but in addition to that also considerably within a single cell (referred to as CDMA intra-cell interference). For such CDMA cellular systems it is therefore an important overall system design objective to minimize any excessive CDMA interference among the communicating users and complementary, to capture and utilize as much energy from a desired CDMA user signal as possible. This system design requirement, although a generic requirement applicable to any multiple access method within cellular telecommunications systems, is less stringent for FDMA and TDMA based systems in which intra-cell interference is avoided by the intrinsic properties of the respective multiple access method and inter-cell interference is limited by means of pre-planned cellular frequency re-use schemes. Thus, CDMA unlike FDMA or TDMA operates in a strictly interference limited manner. Nevertheless, soft handoff will reduce the inter-cell interference of a TDMA system and therefore also improve the system capacity, however, the gain will be less than for a CDMA system. In the following, the invention is exemplified for the case of a CDMA cellular telecommunications system.

Several methods implementing the just mentioned CDMA system design objective can be readily identified for the above referenced exemplary embodiment of a CDMA cellular telecommunications system. For example, the described closed loop MS transmit power control method has the objective to continuously equalize the received qualities of all uplink CDMA signals within a single BS against the background of rapidly changing radio propagation channels undergoing fast and slow fading processes. For this purpose, the BS estimates periodically the received Eb/No, indicative of the signal quality from each MS CDMA uplink communication and subsequently transmits an appropriate power control command on the downlink communication channel to the MS which in turn sets the CDMA transmitter power accordingly. Ideally, all MS CDMA uplink signals are received at the BS with the same quality and in addition to that, minimum strength necessary in order to maintain the communication link subject to a predetermined quality threshold.

Another embodiment of the previously mentioned system design objective is the method of mobile assisted soft handoff in conjunction with signal diversity combining during an active CDMA communication which will be summarized in the following and to which the present invention is closely related.

Mobile assisted soft handoff in conjunction with signal diversity combining comprises the method of relaying the user communication signals on the transmission segment between MS and MSC synchronously via a first and a second BS in the uplink and downlink direction and performing signal diversity reception at the MS and MSC in order to enhance the user signal quality. This method is invoked by the MSC when a MS communicating initially with only a first BS has moved into the overlapping coverage areas of this first BS and a second BS and has reported the availability of a sufficiently strong signal from this second BS to the MSC. At no time instant during soft handoff in conjunction with signal diversity combining does the MS interrupt its communications with the MSC. The MSC typically deploys post-detection/decoding, selective combining of the digitally encoded speech frames.

In order to enable the reporting assistance of the MS during soft handoff initiation all BSs may transmit a CDMA downlink reference signal, referred to as pilot signal. MSs, when roaming throughout the service area of the CDMA cellular telecommunications system periodically demodulate the pilot signals of the various neighboring BSs during an ongoing communication with a first BS and derive a corresponding pilot signal quality indication. Again, the measured pilot Eb/No may serve as a signal quality criteria. This indication determines a ranked list of candidate BSs for handoff and is transmitted in form of signaling information to the MSC. It should be understood that also the first BS may perform continuously CDMA uplink signal quality measurements and based upon these observations may give a soft handoff request indication to the MSC.

Usually, soft handoff in conjunction with signal diversity combining is initiated by the MSC if the MS reports that the pilot signal quality of a second BS in addition to that of the first BS is sufficiently good according to predetermined thresholds made available to the MS and the MSC as well as the second BS can obtain the required resources for the soft handoff transition. Subsequently, the MS will be instructed by the MSC via the first BS by means of signaling to enter the soft handoff state and to commence signal diversity combining on the downlink.

Moreover, the MSC initiates the additional relay of the user signals via the second BS and commences diversity combining of the user signal in the uplink direction. Both participating BSs invoke autonomously the previously mentioned closed loop power control method. The MS sets its CDMA transmit power to the minimum of the two commanded power levels in order to reduce excessive CDMA interference with the other communication links.

Finally, when the MS is firmly established within the area of the second BS and the pilot signal received from the first BS has weakened sufficiently according to predetermined thresholds made available to the MS it will report this condition to the MSC which in turn decides to terminate the soft handoff with signal diversity combining and will use subsequently only the second BS for maintaining the CDMA communications.

This process of soft handoff with signal diversity combining may be repeated as the MS moves within the service area of the CDMA cellular telecommunications system and as the measured CDMA signal strength indications suggest.

An essential criteria for a proper soft handoff signal diversity combining is that diversity signals received via different routes have a sufficiently small phase difference. In prior art CDMA systems, synchronized base stations are utilized and therefore the radio link does normally not cause problems in view of the diversity combining. The differential delay times for radio signals traversing between a MS and two different, synchronized BSs are typically in the order of a few microseconds. However, the diversity signals are further relayed via different terrestrial transmission systems using possibly different routes between the base stations and the controlling mobile exchange MSC, whereby the transmission delays may differ considerably on each link. Delay differentials in the order of a few milliseconds may be encountered in practice. This situation may cause problems, especially in the downlink direction: assuming that the BSs and the MSC use different timing sources, then the mobile exchange MSC will have no or not sufficiently precise information about the radio timing at the base stations at call setup and will start sending user information frames at an arbitrary or default phase with regard to the BS timing. However, a small delay in the frame arrival at the BS may cause the radio transmission of that frame to be delayed to the next forthcoming radio frame boundary, about 20 ms later. This is an intolerable situation considering speech delay requirements and the required synchronism during soft handoff with diversity combining.

Prior art cellular telecommunications systems, such as e.g. the GSM system, do address the problem of frame phase alignment between user information radio frames and the corresponding terrestrial frames. Indeed, for the GSM system, an adaptive time alignment procedure is specified for the user information frames which the objective to minimize speech frame buffering delays. This procedure works, even if the BS and the MSC are timed independently. However, the mentioned procedure does not support frame time alignment for more than one participating BS, as is required during soft handoff and covered by the present invention.

SUMMARY OF THE PRESENT INVENTION

It is an object of the present invention to provide a method and apparatus to synchronize the transmission of the user signals between the participating BSs and MS during a soft handoff with signal diversity combining with the objective to enable reliable signal diversity combining within the MS, even if different timing sources are used for the BSs and the MSCs, respectively.

It is a further object to minimize buffering delays of user speech signals in the downlink direction during soft handoff.

One aspect of the invention is, in a cellular telecommunications system in which a user mobile station relays user communication radio signals via at least one of a plurality of base stations and in which said base stations further relay said user communication signals to and from a controlling mobile exchange connected to another system user, said further relay of user information signals being performed by using digital frames carried on digital transmission connections in the uplink and downlink direction, a method for soft handoff comprising the steps of initiating a soft handoff with diversity combining so as to cause said controlling mobile exchange communicate concurrently with said mobile station via a first base station and a second base station, first transmission of said user communication frames in the uplink and downlink direction between the controlling mobile exchange and said first base station on a first digital transmission connection, first buffering of said downlink user communication frames in said first base station prior to a radio transmission from said first base station to said mobile station, first sending of time alignment requests with regard to said user communication frames, from said first base station to said controlling mobile exchange, said time alignment requests being intended for a first controlling of the delay of said first buffering at said first base station, second transmission of said user communication frames in the uplink and downlink direction between the controlling mobile exchange and said second base station on a second digital transmission connection, second buffering of said downlink user communication frames in said second base station prior to a radio transmission from said second base station to said mobile station, second sending of time alignment requests with regard to said user communication frames, from said second base station to said controlling mobile exchange, said time alignment requests being intended for a second controlling of the delay of said second buffering at said second base station, third buffering of downlink communication signals from said other system user at said controlling mobile exchange, processing of said buffered downlink communication signals from said other system user at said controlling mobile exchange, said processing resulting in said downlink user communication frames, fourth buffering of said processed downlink user communication frames in said controlling mobile exchange prior to said first downlink transmission from said controlling mobile exchange to said first base station, the frame time alignment of said first downlink transmission being responsive to said first time alignment requests, fifth buffering of said processed downlink user communication frames in said controlling mobile exchange prior to said second downlink transmission from said controlling mobile exchange to said second base station, the frame time alignment of said second downlink transmission being responsive to said second time alignment requests.

Another aspect of the invention is a cellular telecommunications system comprising a plurality of mobile exchanges, a plurality of base stations, and a user mobile stations relaying user communication radio signals via at least one of said base stations, said one of the base stations further relaying said user communication signals to and from a controlling mobile exchange connected to another system user, and said relay of user information being performed by using digital frames carried on digital transmission connections in uplink and downlink directions, means for initiating a soft handoff with diversity combining so as to cause said controlling mobile exchange communicate concurrently with said mobile station via a first base station and a second base station, first transmission means for transmitting said user communication frames in the uplink and downlink direction between the controlling mobile exchange and said first base station on a first digital transmission connection, first buffering means for buffering said downlink user communication frames in said first base station prior to a radio transmission from said first base station to said mobile station, first sending means for sending time alignment requests with regard to said user communication frames, from said first base station to said controlling mobile exchange, said time alignment requests being intended for a first controlling of the delay of said first buffering means at said first base station, second transmitting means for transmitting user communication frames in the uplink and downlink direction between the controlling mobile exchange and said second base station on a second digital transmission connection, second buffering means for buffering said downlink user communication frames in said second base station prior to a radio transmission from said second base station to said mobile station, second sending means for sending time alignment requests with regard to said user communication frames, from said second base station to said controlling mobile exchange, said time alignment requests being intended for a second controlling of the delay of said second buffering means at said second base station, third buffering means for buffering downlink communication signals from said other system user at said controlling mobile exchange, processing means for processing said buffered downlink communication signals from said other system user at said controlling mobile exchange, said processing resulting in said downlink user communication frames, fourth buffering means for buffering said processed downlink user communication frames in said controlling mobile exchange prior to said first downlink transmission from said controlling mobile exchange to said first base station, the frame time alignment of said first downlink transmission being responsive to said first time alignment requests, fifth buffering means for buffering said processed downlink user communication frames in said controlling mobile exchange prior to said second downlink transmission from said controlling mobile exchange to said second base station, the frame time alignment of said second downlink transmission being responsive to said second time alignment requests.

The basic idea of the invention is to compensate the differential delay between two or more terrestrial routes to two or more base stations during soft handoff. To that purpose, a novel time alignment (TA) procedure is employed. The base stations act as masters in the TA procedure and are therefore provided with an accurate timing reference. There should therefore be no long term drift between the timing of the base stations, although this condition is not essential for the proper operation of the TA procedure of the present invention. The time alignment of the user information frames between the radio link and the terrestrial transmission links for the uplink direction (from a mobile station to an exchange) is considered to be performed internally in the base station participating in a soft handoff. In the inventive TA procedure, each of the base stations participating in a soft handoff sends independently time alignment requests to the mobile exchange to thereby control the frame timing of the corresponding downlink transmission with the objective to enable reliable signal diversity combining within the MS. The mobile exchange buffers the frames for each downlink separately and performs the time alignment, thereby taking into account the TA requests from all BTSs participating in the soft handoff with the further objective to minimize the overall buffering delays in case of speech communications.

BRIEF DESCRIPTION OF THE DRAWINGS

The features and advantages of the present invention will become more apparent from the detailed description set forth below when taken in conjunction with the drawings.

DETAILED DESCRIPTION OF THE PREFERRED EMBODIMENTS

Figure 1:
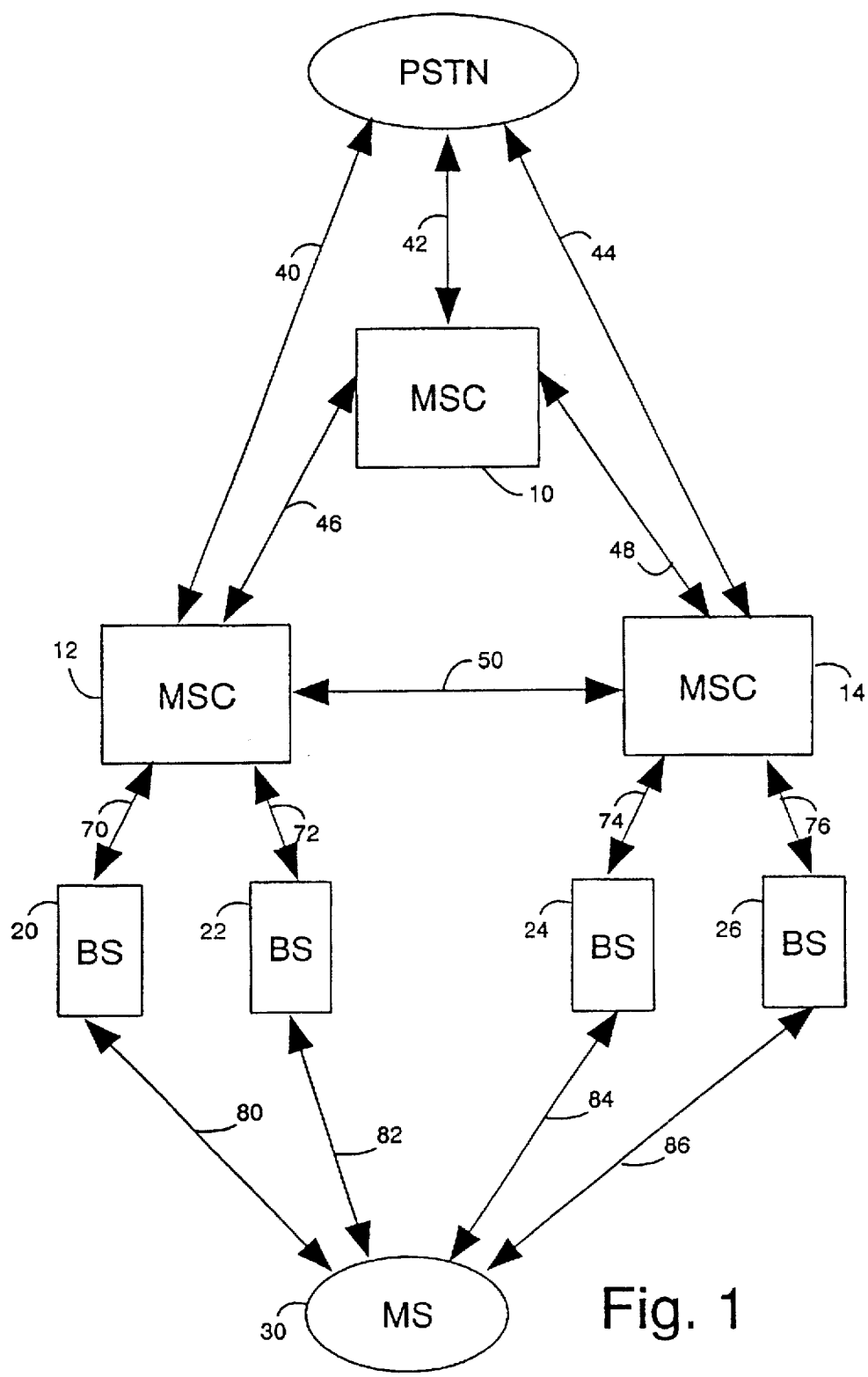
FIG. 1 is a schematic overview of an exemplary CDMA cellular telecommunications system in accordance with the present invention.

FIG. 1 shows an exemplary embodiment of a CDMA cellular telecommunications system to which the present invention relates. The system illustrated in FIG. 1 improves the prior art CDMA soft handoff and macrodiversity signal combining techniques, as substantially described in "On the System Design Aspects of Code Division Multiple Access (CDMA) Applied to Digital Cellular and Personal Communications Networks", Allen Salmasi and Klein S. Gilhousen, presented at the 41st IEEE *Vehicular Technology Conference* on May 19–22, 1991 in St. Louis, Mo.

Figure 2:
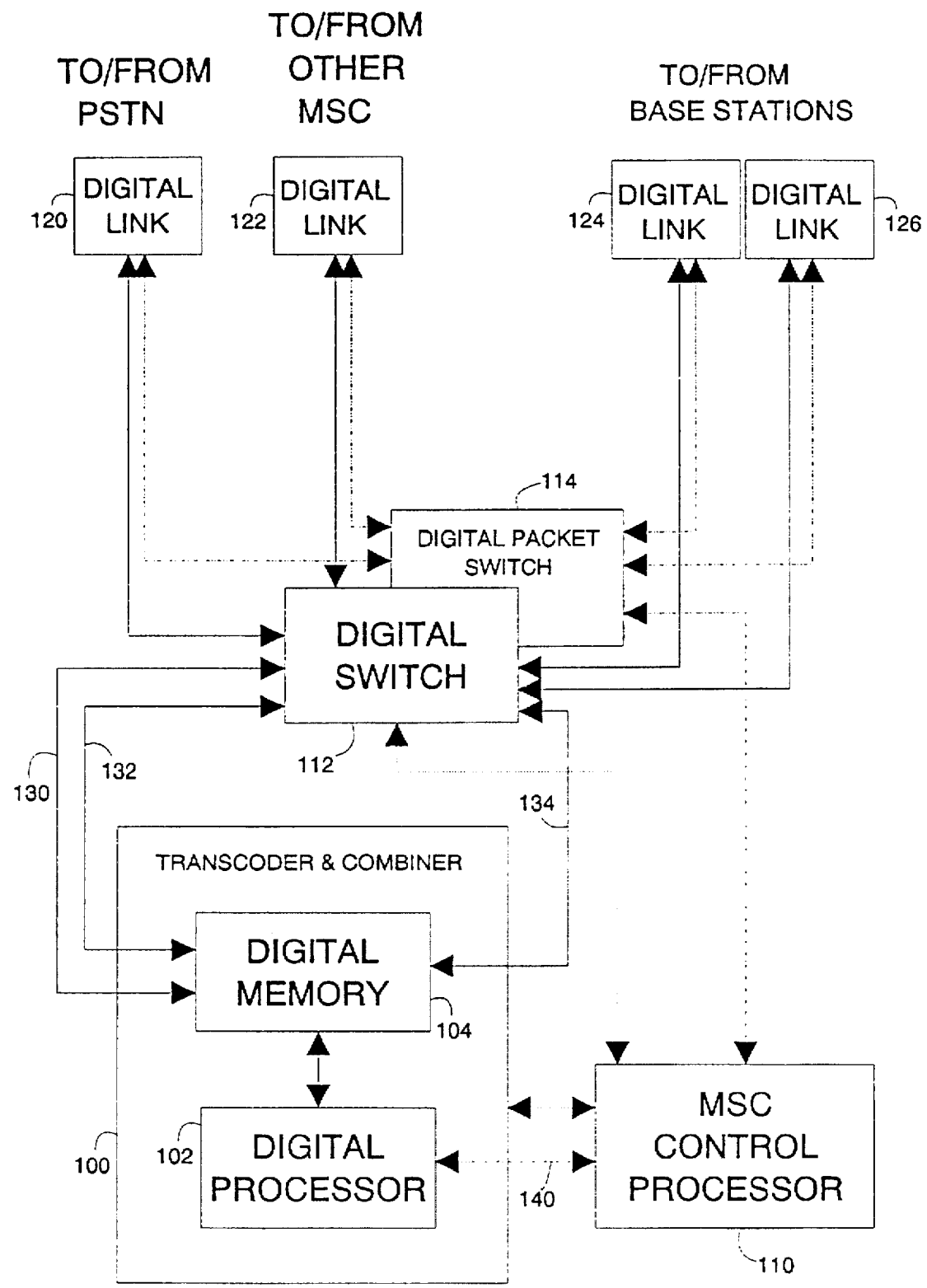
FIG. 2 is a block diagram showing a preferred embodiment mobile switching center for use within a CDMA cellular telecommunications system.

FIG. 2 shows an exemplary embodiment of a MSC used in a CDMA cellular telecommunications system to which the present invention relates.

Digital links (120,122,124,126) connect the mobile exchange MSC with the public switched telephone network PSTN, other mobile exchanges MSC and base stations BS, respectively. These digital links carry the user information such as voice and, additionally, signaling information. The preferred embodiment of the present invention assumes that the signaling information is of packetized type and is multiplexed together with the user information onto one and the same physical transmission facility. T1 transmission facilities together with Signaling System No 7 may serve as an exemplary embodiment of such a digital link arrangement.

The user information stream is switched among the mentioned entities by means of a digital switch 112. The corresponding signaling information is transmitted, received and relayed by a packet switch 114. Packet switch 114 is also connected to a MSC control processor 110 which acts as a signaling information source and sink, respectively. MSC control processor 110 interprets and reacts upon signaling messages addressed to it and may also solicit signaling messages to other entities, whenever appropriate. MSC control processor 110 also controls the connection arrangements within the digital switch 112 in accordance with the call status. Moreover, MSC control processor 110 allocates and de-allocates transcoder & combiner equipment 100 during call setup and tear down from a corresponding resource pool (only one piece of this transcoder & combiner equipment 100 is shown in the figure). The timing of the MSC may be derived from the timing present on the PCM transmission facilities connected to the PSTN, such as the link 120.

Transcoder & combiner equipment 100 is needed in order to convert between the typically typically u-law encoded voice as used in the PSTN and the low rate digital voice coding such as CELP used on the radio links. In addition to the transcoding function, transcoder & combiner equipment 100 also implements the signal diversity combining in the uplink direction and signal duplication in the downlink direction. Moreover, transcoder & combiner equipment 100 synchronizes during soft handoff with signal diversity combining the information flows to and from the participating BSs, transmitted on the digital links 124,126 and switched through digital switch 112 via circuits 130,132 with the information flow to and from the PSTN, switched through the digital link 120, digital switch 112 and circuit 134 (only 2-branch BS diversity is depicted in FIG. 2).

In the preferred embodiment of the present invention, the user communication signals, comprising digitized voice or data, multiplexed together with the signaling information related to this connection, are carried in a digital, framed format suitable for the terrestrial transmission links 124,126 between the BSs and the MSC. These frames are subsequently referred to as transcoder & combiner frames. In addition to this user information, transcoder & combiner frames may also contain information supplied by the BSs which is relevant to the signal quality as used for the signal diversity combining within the MSC in the uplink direction. Moreover, the transcoder & combiner frames contain digital signals (in the following referred to as "time alignment request" signals) supplied by the BSs and the MSC which are relevant for synchronizing the simultaneous links 124, 126 between BSs and the MSC during a soft handoff with signal diversity combining. The transcoder & combiner frames also have some spare capacity (spare bit fields) which are used in case the transmission of downlink transcoder & combiner frames needs to be speeded up during the synchronization procedure of the present invention.

These transcoder & combiner frames arriving and leaving on the circuits 130,132,134 are buffered in the digital memory 104 for the uplink and downlink direction, respectively. Digital processor 102 reads and writes cyclically the transcoder & combiner frames from and to digital memory 104. In the uplink direction, a signal quality indication attached to the transcoder & combiner frames arriving from circuits 130,132 into the memory 104 is inspected and processor 102 performs the diversity selection based on these indications. The association of the multiple transcoder & combiner frames arriving during a soft handoff with diversity combining is thereby not a problem in the preferred embodiment which assumes that the transcoder & combiner frame duration is large (20 ms) compared to the maximum expected differential delay between the multiple uplink transmissions (<5 ms). Thus, associated (i.e. to be combined/selected) frames are characterized by arriving within this short delay window on the multiple uplinks.

In the downlink direction, voice samples from the other system user, arriving from circuit 134 into the memory 104 are transcoded and packed into transcoder & combiner frames by processor 102. During a soft handoff these transcoder & combiner frames are buffered for each downlink connection separately in memory 104. Processor 102 in conjunction with memory 104, also advances or delays the transmission times (or frame boundaries) of transcoder & combiner frames according to the above mentioned time alignment request signals received from the BSs in the uplink direction, in order to maintain downlink synchronization of the links 124,126 during a soft handoff with signal diversity combining.

Transcoder & combiner equipment 100 by means of the digital processor 102 also extracts, respective inserts the user signaling information from, respective into the transcoder & combiner frames and offers, respective receives this signaling information to MSC control processor 110 via a circuit 140. By these means, MSC control processor 110 receives MS signaling information such as pilot strength measurement reports. Thus, MSC control processor 110 possesses the necessary information to initiate and terminate inter-MSC or intra-MSC soft handoffs, as well as control handoffs. Furthermore, by these means MSC control processor 110 can issue the appropriate handoff commands to the MS via circuits 140,130,132 and links 124,126 as well as via the digital packet switch 114 and link 122 to other MSCs, should this be required.

Figure 3:
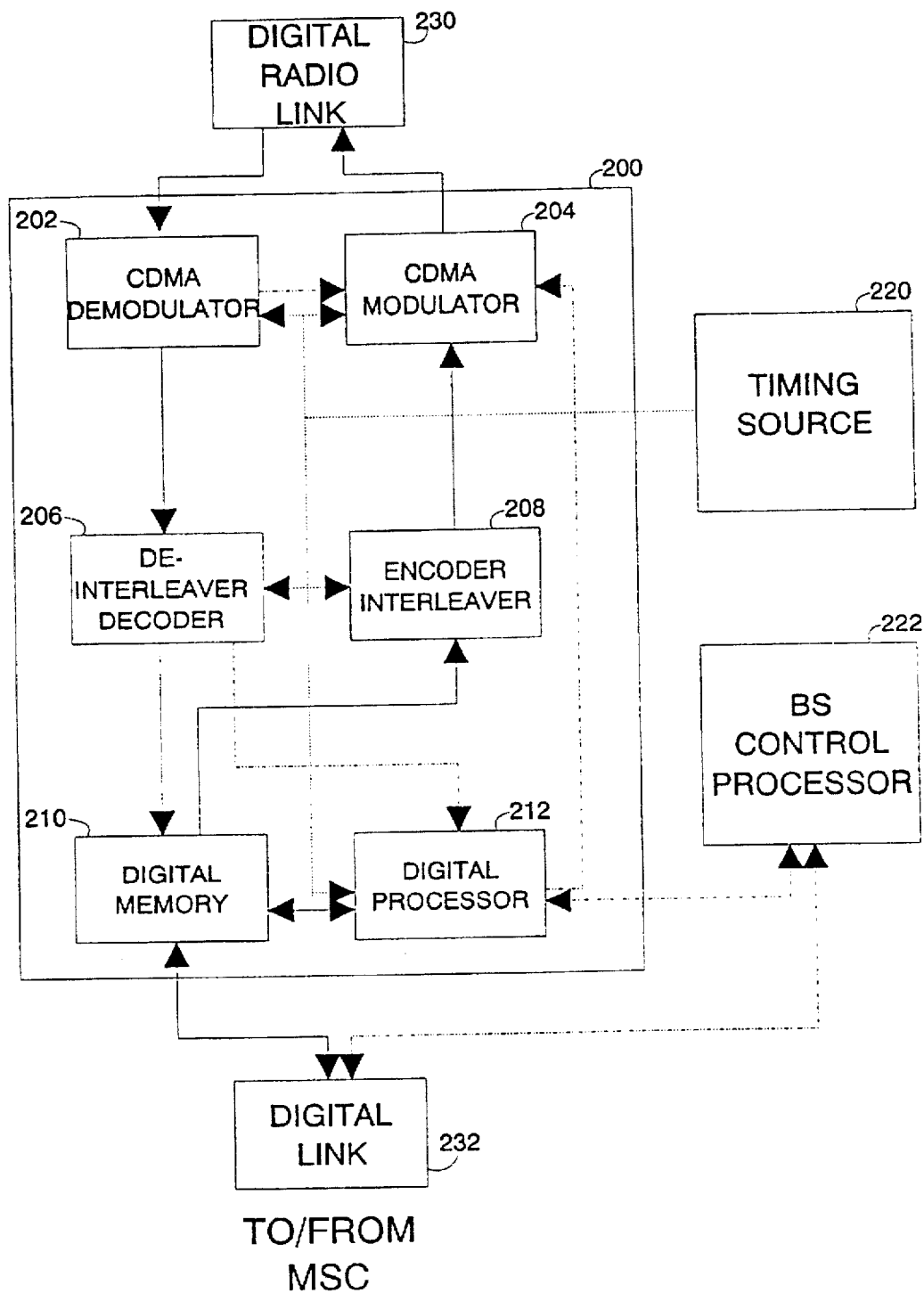
FIG. 3 is a block diagram showing a preferred embodiment base station for use within a CDMA cellular telecommunications system.

FIG. 3 shows an exemplary embodiment of a BS used in a CDMA cellular telecommunications system to which the present invention relates.

Block 200 shows the apparatus required to support a single CDMA communication within a BS, referred to as CDMA channel equipment (only one is shown).

In the uplink direction the CDMA user communication signals are received from the digital CDMA radio link 230, demodulated by the CDMA demodulator 202, de-interleaved and channel decoded by the de-interleaver & decoder 206, converted into transcoder & combiner frames and buffered for the terrestrial transmission within digital memory 210 and finally transmitted on the digital link 232 towards the MSC.

In the downlink direction, the transcoder & combiner frames are received from the MSC via digital link 232, buffered and converted into a presentation appropriate for the BS within digital memory 210, channel encoded and interleaved by encoder & interleaver 208, CDMA modulated by the CDMA modulator 204 and finally transmitted on the digital radio link 230.

In the preferred embodiment of the present invention the BS possesses a network independent timing source 220 which provides a reference signal of high accuracy as required for efficient CDMA operation and utilized by the CDMA channel equipment 200. Such a timing source may be derived e.g. from the GPS satellite signal and can be provided globally to each BS thus enabling a network of mutually synchronized BSs.

The BS further comprises a BS control processor 222. The BS control processor 222 receives and transmits signaling information from and to digital link 232 connected to the MSC. The BS control processor 222 performs the resource management of the BS, such as the allocation and de-allocation of CDMA channel equipment for user connections (calls). The BS control processor 222 thus responds to CDMA channel assignment requests related to a call setup as well as to CDMA channel assignment requests related to soft handoff requests from the MSC.

Digital processor 212 in conjunction with the buffer memory 210 performs the packing and unpacking of the BS internal representation of the CDMA user communications signal to and from transcoder & combiner frames in the uplink, respective downlink direction. In the preferred embodiment of the present invention, the previously mentioned transcoder & combiner frames also contain information supplied by the de-interleaver & channel decoder 206 and provided to the digital processor 212 which is indicative of the signal quality of the CDMA radio frames as received from the uplink CDMA radio link 230 and which is used for the signal diversity combining within the MSC in the uplink direction. Moreover, the transcoder & combiner frames contain time alignment request signals supplied by the digital processor 212 which are relevant for synchronizing the digital link 232 between the BS and the MSC during a soft handoff with signal diversity combining.

As noted above, the present invention relates to soft handoff and macrodiversity signal combining techniques. Within a cellular telecommunications system of the present invention soft handoff with signal diversity combining can be performed even in the case that the involved BSs are connected to two different MSCs, in the following referred to as inter-MSC soft handoff with signal diversity combining. These MSCs are assumed to be connected either permanently, or on a circuit switched basis via digital links for the transmission of user traffic signals and inter-MSC handoff signaling information. Inter-MSC handoff is described more detailed in a copending PCT patent application having the same filing date and title "Soft handoff in a cellular telecommunications system". The application is incorporated herein by a reference.

The cellular telecommunications system of the present invention further assumes the use of the mobile assisted soft handoff method as previously described for prior art CDMA systems, including the transmission of CDMA pilot signals by all BSs as a downlink signal strength reference signal, appropriate CDMA pilot signal strength measurement and processing equipment within the MS and signaling means between the MS and the controlling MSC in order to communicate handoff trigger conditions and handoff initiation, respective termination commands based upon the pilot signal strength measurements performed by the MS.

Synchronization of transcoder & combiner frames between base stations (BSs) and mobile exchange (MSC) during soft handoff.

In the following it is assumed that MS 30 originates the communications on a first BS 24 connected to MSC 14 which provides access to the PSTN and other MSCs 10,12.

In the preferred embodiment the time alignment procedure for the first base station, i.e. BS 24, is a two-state procedure. First, a procedure of "Initial Time Alignment" is performed by BS 24 and MSC 14 during the beginning of the call with the objective to establish a rough phase synchronism for the transcoder & combiner frame timing. BS 24 tries to minimize the buffering time of transcoder & combiner frames within memory 210.

In the initial state, the transmission of transcoder & combiner frames (or simple: frames in the following) in the downlink direction is only delayed by MSC 14 as commanded by the BS 24. The transcoder & combiner equipment 100 is able to adjust the nominal time for transmitting the frames (nominal frame boundary) by multiples of a predetermined step size, 125 us. When receiving the first uplink frame during the call initiation, the transcoder & combiner equipment 100 shall start sending downlink frames towards the BS 24 with arbitrary or default phase related to the uplink frame phase. The processor 212 of the BS 24 calculates the required timing adjustment and returns an uplink frame including the number of steps by which the frames in the downlink direction should be delayed. The number of steps may be a binary number in a dedicated field ("TA request" field) of the uplink transcoder & combiner frames. When receiving this information, the transcoder & combiner equipment 100 processes this data and sets a field ("TA response" field) in the next downlink frame as ordered and delays the subsequent frame accordingly. When a frame is delayed due to timing adjustments, the equipment 100 shall fill the gap between the frames with appropriate number of bits, e.g. binary "1". After having adjusted the timing, the equipment 100 shall receive a predetermined number of transcoder & combiner uplink frames before a new adjustment is made. This in order to avoid oscillation in the regulation.

The transcoder and combiner equipment 100 shall change from the "Initial Time Alignment" state to the "Static Time Alignment" state when it has performed a predetermined number of subsequent timing adjustments which are less than a further predetermined threshold. In the "Static Time Alignment State" the achieved frame phase synchronism is maintained and a potential drift between the timing of BS 24 and MSC 14 during the ongoing call is compensated. Moreover, in the case of a soft handoff the frame time alignment towards the newly joining BS is performed within the "Static Time Alignment State".

In the Static Time Alignment state, the transcoder & combiner equipment 100 performs timing adjustments in single steps of predetermined duration, e.g. 250 μs. The transmission timing of the frame boundary may be either delayed, advanced or not changed. When receiving a time alignment request from the BS 24, equipment 100 skips or repeats (duplicates) two PCM speech samples from the other system users downlink speech communications within memory 104 and advances or delays the transcoding of them into a subsequent downlink frame for buffering in memory 104 for transmission. This is done in order to avoid further buffering delays of the downlink speech signal within memory 104.

After having adjusted the timing, the equipment 100 shall receive at least a predetermined number of uplink frames before a new adjustment is made.

It should be understood that in this condition the downlink frame buffering delays in memories 104 and 210 are minimized to system inherent limits. Only unavoidable, small guard times due to processing delays and the large delay caused by the speech transcoding process itself (20 ms) are present. However, there are no additional delays caused by a phase mismatch of the transcoder and combiner frames.

A soft handoff will be initiated by MSC 14 when MS 30 communicating initially only with the first BS 24 has moved into the overlapping coverage areas of BS 24 and a neighboring BS 26 and has reported the availability of a sufficiently strong signal from BS 26 to MSC 14. In the soft handoff in conjunction with signal diversity combining the user communication signals are relayed on transmission segments 84,74 and 86,76 between MS 30 and MSC 14 synchronously via BS 24 and BS 26, respectively, in uplink and downlink direction. MSC 14 and MS 30 perform signal diversity reception in order to enhance the user signal quality.

Terrestrial transmission segments 74 and 76 between MSC 14 and BS 24 and BS 26, respectively, may use different routes and different transmission systems, and therefore the occurring transmission delays may differ.

Thus, according to the present invention a differential transmission delay between BSs 24 and 26 is taken into account by the inventive time alignment procedure. Towards this end, the downlink signals from the other system user arriving via circuit 134 into memory 104 are still transcoded only once, however, the resulting downlink transcoder & combiner frames are read out twice and independently from memory 104 for transmission towards circuits 130,132.

The time alignment between MSC 14 and BTS 24 is assumed to be already in the "Static Time Alignment" state, as discussed above. Since only the small (compared to the frame duration) differential delay between the two BSs needs to be compensated, the new transmission circuit 86 of BS 26 goes directly into the "Static Time Alignment" state. Both BS 24 and 26 will independently send timing alignment requests to MSC 14 in order to control their own buffer delays as in the case of a single BS connection. MSC 14, however, takes account time alignment requests from both BSs 24 and 26. For example, assuming that the downlink frame boundary timing of BS 26 is "earlier" than that of BS 24, processor 102 will duplicate sufficiently many PCM speech samples from the other system users downlink speech communications within memory 104 and thereby advance the transcoding of them into a subsequent downlink frame, so as to fulfill the request of the "earlier" BS 26. As another example, assuming that the downlink frame boundary timing of BS 26 is "later" than that of BS 24, processor 102 will delay the readout of frames towards BS 26 accordingly, but will not change the time instants for the transcoding of the other system users downlink speech communications. In this case, no action takes place with regard to BS 24. As a further example, assuming that the "earlier" BS during a soft handoff requests a delay and would remain the earlier BS even after the delay is performed, processor 102 will skip accordingly PCM samples within memory 104, delay the transcoding of them into a subsequent downlink frame, and delay the readout of frames towards this earlier BS accordingly.

It should be understood that this inventive procedure for user frame TA during soft handoff is optimal in the sense that the end-to-end delay between MS and MSC communications compared to the single link configuration is increased only by the differential delay between the two MSC-BS transmission sections.

It should be also understood that this inventive procedure for user frame TA during soft handoff is further optimal in the sense that the downlink frame buffering delays in memories 104 and 210 are minimized to system inherent limits. Only unavoidable, small guard times due to processing delays and the large delay caused by the speech transcoding process itself (20 ms) are present in addition to the differential delay on the two MSC-BS transmission segments. However, there are no additional delays caused by a phase mismatch of the transcoder and combiner frames during soft handoff.

No other frame TA scheme can deliver a better performance with regard to buffer delay minimization and consequently MS-MSC end-to-end delay minimization during soft handoff, than what the inventive TA procedure offers.

The above procedure is primarily beneficial for speech communications as it minimizes the speech delay perceived by the system users. The same procedure can be performed also for data communications in the uplink and downlink direction. However, the target is here not to minimize the buffering delay of the frame transmission but rather to provide a phase reference by one BTS, typically the first BS 24 assigned during the soft handoff and to provide a system and method for reliable diversity combining.

It should be also understood that more than two BSs can participate during an soft handoff with signal diversity combining. The handoff may also be a inter-MSC soft handoff.

It should be also understood that the method of the present invention can be readily applied to a TDMA cellular telecommunications system. In a TDMA cellular telecommunications system radio links 80, 82, 84, 86 of FIG. 1, would be embodied as TDMA radio links in which several timeslots are used to provide communication channels to the system users. During soft handoff two (or more) timeslots could be used to provide the concurrent radio channels used by the MS and BSs involved in the handoff. All the other mentioned characteristics of the present invention remain the same for TDMA cellular telecommunications system.

The previous description of the preferred embodiments are provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiment herein, but is to be accorded the widest scope consistent with the principles as novel features disclosed herein.

I claim:

1. In a cellular telecommunications system in which a user mobile station relays user communication radio signals via at least one of a plurality of base stations and in which said base stations further relay said user communication signals to and from a controlling mobile exchange connected to another system user, said further relay of user communication signals being performed by using digital frames carried on digital transmission connections in the uplink and downlink directions, a method for soft handoff comprising the steps of initiating a soft handoff with diversity combining so as to cause said controlling mobile exchange communicate concurrently with said mobile station via a first base station and a second base station, transmitting a first transmission of said user communication frames in the uplink and downlink directions between the controlling mobile exchange and said first base station on a first digital transmission connection, first buffering of said downlink user communication frames in said first base station prior to a radio transmission from said first base station to said mobile station, first sending of time alignment requests with regard to said user communication frames, from said first base station to said controlling mobile exchange, said time alignment requests being intended for a first controlling of the delay of said first buffering at said first base station, transmitting a second transmission of said user communication frames in the uplink and downlink directions between the controlling mobile exchange and said second base station on a second digital transmission connection, second buffering of said downlink user communication frames in said second base station prior to a radio transmission from said second base station to said mobile station, second sending of time alignment requests with regard to said user communication frames, from said second base station to said controlling mobile exchange, said time alignment requests being intended for a second controlling of the delay of said second buffering at said second base station, third buffering of downlink communication signals from said other system user at said controlling mobile exchange, processing of said buffered downlink communication signals from said other system user at said controlling mobile exchange, said processing resulting in said downlink user communication frames, fourth buffering of said processed downlink user communication frames in said controlling mobile exchange prior to said first downlink transmission from said controlling mobile exchange to said first base station, the frame time alignment of said first downlink transmission being responsive to said first time alignment requests, fifth buffering of said processed downlink user communication frames in said controlling mobile exchange prior to said second downlink transmission from said controlling mobile exchange to said second base station, the frame time alignment of said second downlink transmission being responsive to said second time alignment requests.

2. A method according to claim 1 wherein a first time alignment request, respectively and a second time alignment request, are indicative of an advance or a delay in said first, respectively and said second, downlink transmissions of said downlink communication frames relative to the setting in effect, said advance or delay indication being according to threshold values, said first controlling of the delay of said first buffering and said second controlling of the delay of said second buffering mean minimize said first and said second buffering delays, said third buffering of said downlink communication signals from said other system user at said controlling mobile exchange further comprising the step of storing said downlink communication signals of said other system user in the form of digital code words into a digital buffer memory, said processing of said buffered downlink communication signals further comprising the steps of manipulating the contents of said digital buffer memory responsive to said first and said second time alignment requests, and transcoding said manipulated contents of said digital buffer memory into said downlink user communications signals.

3. A method according to claim 2, wherein the step of manipulating the contents of said digital buffer memory comprises one of the following steps adding digital code words into said digital buffer memory, deleting digital code words from said digital buffer memory, leaving the content of said digital buffer memory unchanged.

4. A method according to claim 1 characterized in that said fourth and said fifth buffering of said processed downlink user communication frames in said controlling mobile exchange is used to compensate the differential time delay of said first transmission of said user communication frames on said first digital transmission connection and said second transmission of said user communication frames on said second digital transmission connection.

5. A method according to claim 1, wherein a combined first buffering delay, comprising the delays of said first buffering, said fourth buffering and said third buffering, is jointly minimized together with a combined second buffering delay, comprising the delays of said second buffering, said fifth buffering and said third to buffering, by means of said first and said second time alignment requests and said processing of said downlink communication signals.

6. A method according to claim 1, wherein a combined first buffering delay, comprising the delays of said first buffering, said fourth buffering and said third buffering, is jointly minimized together with a combined second buffering delay, comprising the delays of said second buffering, said fifth buffering and said third buffering, and wherein the difference between said first combined buffering delay and said second combined buffering delay corresponds to the differential time delay of said first transmission of said user communication frames on said first digital transmission connection and said second transmission of said user communication frames on said second digital transmission connection.

7. A method according to claim 1 wherein the user communication radio signals relayed between said mobile station and said first and said second base stations are CDMA spread spectrum modulated.

8. A method according to claim 1 wherein said user communication radio signals relayed between said mobile station and said first and said second base stations are TDMA modulated.

9. A cellular telecommunications system comprising
a plurality of mobile exchanges,
a plurality of base stations, and
a user mobile station relaying user communication radio signals via at least one of said base stations, said one of the base stations further relaying said user communication signals to and from a controlling mobile exchange connected to another system user, and said relay of user communication signals being performed by using digital frames carried on digital transmission connections in uplink and downlink directions,
means for initiating a soft handoff with diversity combining so as to cause said controlling mobile exchange communicate concurrently with said mobile station via a first base station and a second base station,
first transmission means for transmitting said user communication frames in the uplink and downlink directions between the controlling mobile exchange and said first base station on a first digital transmission connection,
first buffering means for buffering said downlink user communication frames in said first base station prior to a radio transmission from said first base station to said mobile station,
first sending means for sending time alignment requests with regard to said user communication frames, from said first base station to said controlling mobile exchange, said time alignment requests being intended for a first controlling of the delay of said first buffering means at said first base station,
second transmitting means for transmitting user communication frames in the uplink and downlink direction between the controlling mobile exchange and said second base station on a second digital transmission connection,
second buffering means for buffering said downlink user communication frames in said second base station prior to a radio transmission from said second base station to said mobile station,
second sending means for sending time alignment requests with regard to said user communication frames, from said second base station to said controlling mobile exchange, said time alignment requests being intended for a second controlling of the delay of said second buffering means at said second base station,
third buffering means for buffering downlink communication signals from said other system user at said controlling mobile exchange,
processing means for processing said buffered downlink communication signals from said other system user at said controlling mobile exchange, said processing resulting in said downlink user communication frames,
fourth buffering means for buffering said processed downlink user communication frames in said controlling mobile exchange prior to said first downlink transmission from said controlling mobile exchange to said first base station, the frame time alignment of said first downlink transmission being responsive to said first time alignment requests,
fifth buffering means for buffering said processed downlink user communication frames in said controlling mobile exchange prior to said second downlink transmission from said controlling mobile exchange to said second base station, the frame time alignment of said second downlink transmission being responsive to said second time alignment requests.

10. A system according to claim 9 wherein
a first time alignment request, respectively and a second time alignment request, are indicative of an advance or a delay in said first, respectively and said second, downlink transmissions of said downlink communication frames relative to the setting in effect, said advance or delay indication being according to threshold values, said first and said second sending means for said first controlling of the delay of said first buffering means and said second controlling of the delay of said second buffering means minimize the delays of said first and second buffering means, said third buffering means further comprising means for storing said downlink communication signals of said other system user in the form of digital code words into a digital buffer memory, said processing means for processing said buffered downlink communication signals further comprising means for manipulating the contents of said digital buffer memory responsive to said first and second time alignment requests, and means for transcoding said manipulated contents of said digital buffer memory into said downlink user communications signals.

11. A system according to claim 10, wherein said means for manipulating the contents of said digital buffer memory comprises one of the following functions
adding digital code words into said digital buffer memory,
deleting digital code words from said digital buffer memory,
leaving the content of said digital buffer memory unchanged.

12. A system according to claim 9 characterized in that said fourth and said fifth buffering means for processing downlink user communication frames in said controlling mobile exchange is used to compensate the differential time delay of said first transmission means transmitting said user communication frames on said first digital transmission connection and said second transmission means transmitting said user communication frames on said second digital transmission connection.

13. A system according to claim 9, characterized in that a combined first buffering delay of said first buffering means, said fourth buffering means and said third buffering means is jointly minimized together with a combined second buffering delay of said second buffering means, said fifth buffering means and said third buffering means by said first and said second time alignment requests and said processing of said downlink communication signals.

14. A system according to claim 9, characterized in that a combined first buffering delay of said first buffering means, said fourth buffering means and said third buffering means is jointly minimized together with a combined second buffering delay of said second buffering means, said fifth buffering means and said third buffering means, and in that the difference between said first combined buffering delay and said second combined buffering delay corresponds to the differential time delay of said first transmission of said user communication frames on said first digital transmission connection and said second transmission of said user communication frames on said second digital transmission connection.

15. A system according to claim 9, wherein the user communication radio signals relayed between said mobile station and said first and said second base stations are CDMA spread spectrum modulated.

16. A system according to claim 9, wherein said user communication radio signals relayed between said mobile station and said first and said second base stations are TDMA modulated.

* * * * *